United States Patent
Bryan et al.

(10) Patent No.: US 9,753,203 B2
(45) Date of Patent: Sep. 5, 2017

(54) LIGHT ASSEMBLY WITH LIGHT PIPE HOLDER

(71) Applicants: Tyco Electronics Corporation, Berwyn, PA (US); Tyco Electronics Canada ULC, Markham (CA)

(72) Inventors: Lyle Stanley Bryan, Kernersville, NC (US); Abraham Louis Shocket, Cary, NC (US); Lucian Iordache, Woodbridge (CA)

(73) Assignees: TE CONNECTIVITY CORPORATION, Berwyn, PA (US); TYCO ELECTRONICS CANADA ULC, Markham (CA)

( * ) Notice: Subject to any disclaimer, the term of this patent is extended or adjusted under 35 U.S.C. 154(b) by 275 days.

(21) Appl. No.: 14/667,818

(22) Filed: Mar. 25, 2015

(65) Prior Publication Data

US 2015/0277035 A1    Oct. 1, 2015

Related U.S. Application Data

(60) Provisional application No. 61/971,331, filed on Mar. 27, 2014.

(51) Int. Cl.
*F21V 8/00* (2006.01)
*F21S 10/00* (2006.01)
(Continued)

(52) U.S. Cl.
CPC ............ *G02B 6/001* (2013.01); *D02G 3/441* (2013.01); *F21S 10/005* (2013.01);
(Continued)

(58) Field of Classification Search
CPC ...... G02B 6/001; G02B 6/006; G02B 6/4472; D02G 3/441; F21S 10/005; F21Y 2101/00; F21Y 2103/00
(Continued)

(56) References Cited

U.S. PATENT DOCUMENTS 5,791,758 A    8/1998 Horgan et al.
5,838,860 A    11/1998 Kingstone et al.
(Continued)

FOREIGN PATENT DOCUMENTS

DE          196 15 516 A1    10/1997
GB          GB 2 153 105     *  8/1985
(Continued)

OTHER PUBLICATIONS

International Search Report, International Application No. PCT/US2015/022623, International Filing Date, Mar. 26, 2015.

*Primary Examiner* — Laura Tso

(57) ABSTRACT

A light assembly is provided that includes a holder and multiple light pipes. The holder extends along a longitudinal axis between a first end and a second end. The holder includes multiple ridges that spiral around the longitudinal axis. The holder includes multiple channels. Each channel is defined between two of the ridges. The light pipes each include a light transmissive interior region. Each of the light pipes is disposed in one of the channels of the holder. The light pipes each have an attachment end that is configured to receive light from a light source. Each light pipe is further configured to transmit the light through the interior region for at least a length of the light pipe.

20 Claims, 5 Drawing Sheets

(51) Int. Cl.
   *D02G 3/44*     (2006.01)
   *F21Y 103/00*   (2016.01)
   *G02B 6/44*     (2006.01)
   *F21Y 115/10*   (2016.01)

(52) U.S. Cl.
   CPC ....... *F21Y 2103/00* (2013.01); *F21Y 2115/10* (2016.08); *G02B 6/0006* (2013.01); *G02B 6/4407* (2013.01)

(58) Field of Classification Search
   USPC .................. 362/551, 554, 555, 382, 581
   See application file for complete search history.

(56) References Cited

U.S. PATENT DOCUMENTS

| | | | |
|---|---|---|---|
| 6,942,373 B2 * | 9/2005 | Buelow, II | G02B 6/0006 362/554 |
| 7,021,808 B2 * | 4/2006 | Currie | G02B 6/001 362/551 |
| 2003/0206419 A1 * | 11/2003 | Longatti | D04C 1/12 362/551 |
| 2004/0012979 A1 * | 1/2004 | Squicciarini | B60Q 1/32 362/555 |
| 2004/0136205 A1 * | 7/2004 | Peng | A01K 27/006 362/570 |

FOREIGN PATENT DOCUMENTS

| | | |
|---|---|---|
| GB | 2 218 221 A | 11/1989 |
| JP | 2000 276914 A | 10/2000 |
| WO | 2014001421 A1 | 1/2014 |

* cited by examiner

LIGHT ASSEMBLY WITH LIGHT PIPE HOLDER

CROSS-REFERENCE TO RELATED APPLICATIONS

The present application claims the benefit of U.S. Provisional Application No. 61/971,331, filed 27 Mar. 2014, and entitled "Light Assembly With Light Pipe Holder," which is incorporated herein by reference in its entirety.

BACKGROUND OF THE INVENTION

The subject matter herein relates generally to light assemblies.

Some known lighting applications call for a dynamic light effect, in which various positions along a defined length are illuminated in a sequence over time. For example, a first point or position may be illuminated at time X, then a second position that is adjacent to the first location may be illuminated at time X+1 while the first position is no longer illuminated. Next, at time X+2, the first and second positions may no longer be illuminated while a third position adjacent to the second position is illuminated. The dynamic light effect may provide the appearance of a light source physically traveling along the defined length, although in actuality all of the light sources are stationary. Dynamic light effects may be utilized for aesthetic purposes as well as for practical purposes in various applications, such as automotive and commercial ambient (interior) lighting applications. Aesthetically, dynamic lighting may create visual stimulations that enhance a perceiver's mood and/or sense of well-being. Practically, dynamic lighting may be used to direct a perceiver to items which need attention, such as a car door that is not fully closed, or to alert a perceiver of pending emergencies by providing a visual warning signal.

In known lighting assemblies that provide dynamic light effects, a plurality of light sources are spaced along a defined length of the light effect, and the light sources are illuminated in sequence to provide the dynamic lighting effect. However, in order to provide a smooth lighting effect along the defined length, many light sources are required. For example, a light assembly that includes light emitting diodes (LEDs) as the light sources along a length of three feet with LEDs located at every inch would require roughly thirty-six LEDs. Each of the thirty-six LEDs requires connection to a power source and each LED must be timed in sequence with the other LEDs, which requires a controller. As the length of the dynamic lighting assembly and/or the density of light sources along the length increase, the costs attributable to parts and assembly may be prohibitive. A need remains for a light assembly that provides a dynamic lighting effect over a variable distance using few light sources.

BRIEF DESCRIPTION OF THE INVENTION

In an embodiment, a light assembly includes a holder and multiple light pipes. The holder extends along a longitudinal axis between a first end and a second end. The holder includes multiple ridges that spiral around the longitudinal axis. The holder includes multiple channels. Each channel is defined between two of the ridges. The light pipes each include a light transmissive interior region. Each of the light pipes is disposed in one of the channels of the holder. The light pipes each have an attachment end that is configured to receive light from a light source. Each light pipe is further configured to transmit the light through the interior region for at least a length of the light pipe.

In an embodiment, a light assembly includes a connector, multiple light pipes, and a holder. The connector includes a housing and multiple light sources held within the housing. The light pipes are each elongated between an attachment end and a distal end. The attachment end of each light pipe is coupled to the housing and optically coupled to one of the light sources. The light emitted by the light sources is received by the corresponding light pipe at the attachment end and transmitted through the light pipe via internal reflection towards the distal end. The holder is elongated along a longitudinal axis between a first end and a second end. The holder has multiple ridges that extend radially outward from a center point of the holder. The ridges spiral around the longitudinal axis along the length of the holder between the first and second ends. The holder includes multiple channels that are each defined between two of the ridges. Each channel is configured to hold one of the light pipes therein.

DETAILED DESCRIPTION OF THE INVENTION

One or more embodiments of the subject matter described herein provide a light assembly with multiple light pipes and a twisted holder. The light assembly is configured to provide a dynamic light effect along a defined path.

Figure 1:
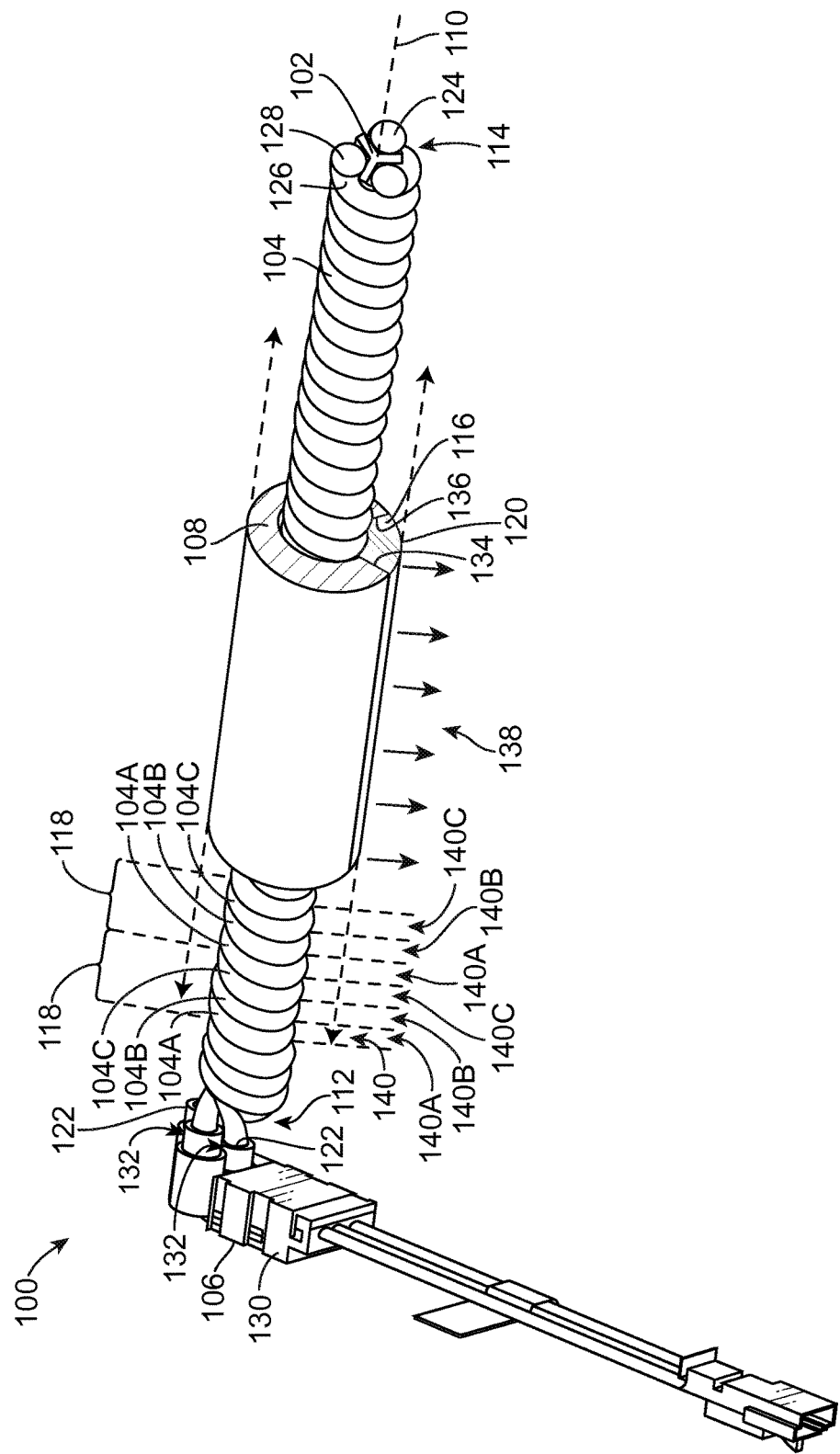
FIG. 1 is a perspective view of a light assembly formed in accordance with an exemplary embodiment.

FIG. 1 is a perspective view of a light assembly 100 formed in accordance with an exemplary embodiment. The light assembly 100 includes a holder 102, multiple light pipes 104, and a connector 106. The holder 102 is elongated and extends along a longitudinal axis 110 between a first end 112 and a second end 114. The second end 114 opposes the first end 112. The holder 102 may form a helix that twists along the length of the holder 102. For example, the holder 102 may twist around the longitudinal axis 110. The holder 102 is configured to receive and hold the multiple light pipes 104, such that the light pipes 104 are disposed on the holder 102.

The multiple light pipes 104 may be formed from a light transmissive material and configured to transmit light therein. Each of the light pipes 104 are elongated between an attachment end 122 and an opposing distal end 124. The light pipes 104 may have a generally cylindrical shape, with a cross-section that is circular, oval, elliptical, or the like. The light pipes 104 have an outer surface 126 and an interior region 128. In an embodiment, the light pipes 104 may be solid. For example, the light pipes 104 may be formed of an acrylic material such that the interior region 128 is composed of the acrylic material and the outer surface 126 is the surface of the acrylic material. In an alternative embodiment, the light pipes 104 may be formed of one or more light conductors within a shell layer. For example, the light pipes 104 may be fiber optic cables including one or more glass strands forming the interior region 128 and a cladding layer surrounding the glass strands forming the outer surface 126.

Figure 2:
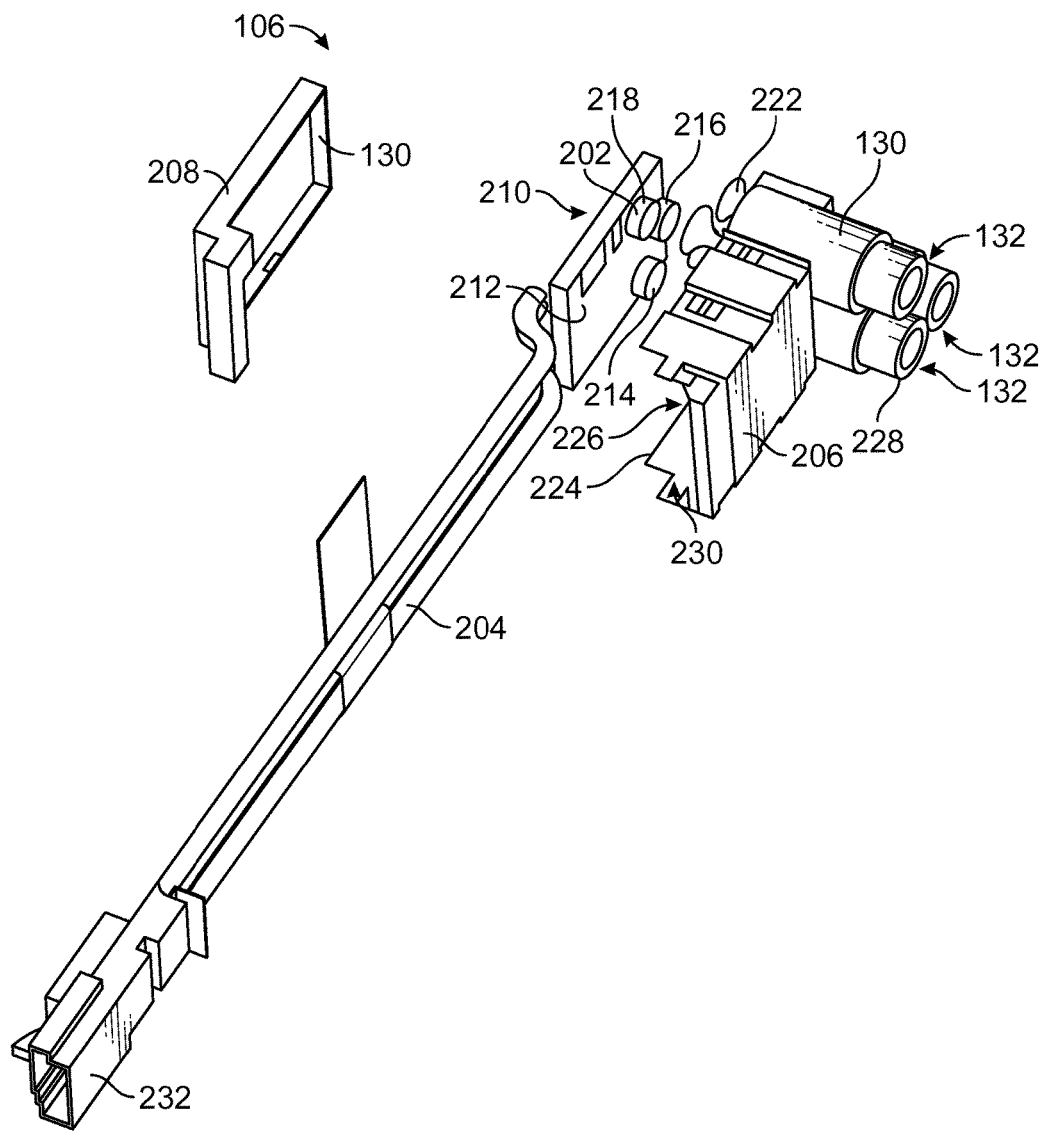
FIG. 2 is an exploded perspective view of a connector according to an embodiment of the light assembly of FIG. 1.

The connector 106 includes multiple light sources 202 (shown in FIG. 2). The light sources 202 are each configured to generate and emit light. For example, the light sources 202 may be light emitting diodes (LEDs). One or more of the LEDs may be tri-color red green blue (RGB) LEDs that are configured to emit red light, green light, blue light, and/or combinations thereof to create many different colors and shades of light. The light sources 202 are mounted within a housing 130. The housing 130 defines multiple ports 132 that are configured to receive the attachment ends 122 of the light pipes 104 therein to mechanically couple the light pipes 104 to the connector 106. Although only two ports 132 are visible in FIG. 1, the illustrated light assembly 100 includes three ports 132, with each port 132 configured to couple to a corresponding one of the three light pipes 104 shown in FIG. 1. Other numbers of ports 132 and light pipes 104 may be used in other embodiments of the light assembly 100.

The light sources 202 (shown in FIG. 2) within the housing 130 are optically coupled to the attachment end 122 of a corresponding light pipe 104. For example, each of the light sources 202 may be located within or proximate to a corresponding port 132 of the housing 130, such that light source 202 optically couples to the attachment end 122 of the light pipe 104 attached to the corresponding port 132. As used herein, two objects are "optically coupled" when light emitted from one of the objects is received by the other object. The term "optically coupled" does not require that the objects be in mechanical engagement with each other, but also does not preclude such mechanical connection. Each of the light sources 202 are optically coupled to a corresponding light pipe 104 such that light emitted by the light sources 202 is received by the corresponding light pipes 104. The light received at the attachment end 122 of a corresponding light pipe 104 is transmitted through the interior region 128 of the light pipe 104 towards the distal ends 124. The light propagates through the light pipes 104 by internal reflection. The light is referred to as traveling in a general direction towards the distal end 124 although it is recognized that individual light rays impinge upon the edge or interface between the outer surface 126 and interior region 128 of the light pipe 104 at various angles. Some light may be emitted from the light pipe 104 prior to reaching the distal end 124.

The use of light pipes allows for the transmission of light over a distance using only a single light source at an end of the light pipe instead of multiple light sources spaced apart along a defined length. However, in known lighting assemblies using light pipes to transmit light, it is difficult to provide dynamic lighting effects. For example, if multiple light pipes are disposed adjacent to each other along a defined length, sequencing the light sources coupled to the light pipes merely illuminates one light pipe at a time without providing an effect that a single light source appears to be physically moving along the defined length. The subject matter disclosed herein provides novel and non-obvious solutions to the problem of producing a dynamic lighting effect using light pipes.

In an exemplary embodiment, the light pipes 104 are spirally wrapped or twisted around the holder 102. In the illustrated embodiment, when viewing the second end 114 of the holder 102, the light pipes 104 are coiled in a common rotational direction (for example, clockwise). The light pipes 104 are wrapped around the holder 102 in a repeating sequence 118 such that each light pipe 104 is positioned axially adjacent to the same light pipe(s) 104 every rotation. For example, with three light pipes 104A, 104B, 104C as shown in FIG. 1, the light pipe 104B is disposed between the other two light pipes 104A, 104C. In other embodiments that employ more than three light pipes 104 around the holder 102, the light pipes 104 may still be wrapped in a repeating sequence in which one light pipe 104 is disposed between the same two light pipes 104 throughout the length of the holder 102. The holder 102 may be configured to receive the light pipes 104 and guide each light pipe 104 into a specific rotational profile that is similar to the other light pipes 104 in order to provide uniform spacing of light pipes 104 throughout the length of the holder 102. Although the light pipes 104 are helically wound, at least some of the light that enters the attachment end 122 of the light pipes 104 follows the winding profile of the light pipes 104 towards the distal end 124 of the light pipes 104 via internal reflection. As such, the spiral coiling of the light pipes 104 does not significantly impact the light propagation characteristics of the light pipes 104.

The light assembly 100 optionally includes a light shroud 108 that covers and/or surrounds a portion of the perimeter of the light pipes 104 and holder 102. The shroud 108 is configured to control the direction that light emits from the light pipes 104 by reflecting and/or absorbing light that is emitted in a non-desired direction or location. For example, the shroud 108 may be formed of an opaque material that absorbs light that impinges thereon. Alternatively, the shroud 108 may include one or more reflective layers that reflect light that impinges thereon away from the reflective layers. The shroud 108 may extend the length of the holder 102, although in the illustrated embodiment only a portion of the shroud 108 is shown in order to view the light pipes 104 interior of the shroud 108. Alternatively or in addition to using the shroud 108 to control the emission of light, the outer surface 126 of the light pipes 104 may be etched or coated with scattering or reflective elements in order to control the locations along the light pipes 104 that light refracts through the outer surface 126 and is emitted therefrom.

The light assembly 100 may include a lens 116. The lens 116 may extend along the length of the holder 102 parallel to the longitudinal axis 110, although only a portion of the lens is shown in FIG. 1. The lens 116 may be formed of a light transmissive material that permits light to transfer through the lens 116. The lens 116 may cover at least part of the perimeter of the light pipes 104 and holder 102. The lens 116 may be coupled to or included within the shroud 108. In the illustrated embodiment, the lens 116 is coupled to the shroud 108 at both a first edge 134 and a second edge 136 of the lens 116 such that the combination of the shroud 108 and lens 116 fully cover the radial perimeter of the twisted holder 102 and light pipes 104. For example, the lens 116 covers part of the perimeter of the holder 102 and light pipes 104, and the shroud 108 covers the rest of the perimeter without significant overlapping between the lens 116 and shroud 108. As such, light that is emitted from the outer surface 126 of the light pipes 104 may impinge upon the shroud 108 or the lens 116. The light rays that strike the shroud 108 may be reflected or absorbed, while the light rays that strike the lens 116 may be transmitted through the lens 116 and emitted from an outer surface 120 of the lens 116. The light that is emitted from the outer surface 120 of the lens 116 may illuminate a region 138 of the surrounding environment. The region 138 may extend along the longitudinal axis 110 proximate to the outer surface 120 of the lens 116.

In operation, the light sources 202 (shown in FIG. 2) may be sequenced such that the light pipes 104 receive light generated by the corresponding light sources 202 at different times. Due to the light pipes 104 being spirally wound around the holder 102, light emitted from the light pipes 104 may be received by the lens 116 at different axial locations along the longitudinal axis 110 at different times. For example, each light pipe 104 may be configured to emit some light towards the lens 116 generally within a specific axial zone 140. The zones 140 align axially with the portions of the respective light pipe 104 that are proximate to the lens 116. Since the light pipes 104 are spirally wrapped in a repeating sequence 118, the zones 140 that are illuminated by the light pipes 104 also repeat in the sequence. For example, light emitted from light pipe 104A may generally illuminate zone 140A, light emitted from light pipe 104B may generally illuminate zone 140B, and light emitted from light pipe 104C may generally illuminate zone 140C. It is stated that the light "generally" illuminates the specific zones 140 because, although the zones 140 align with the corresponding light pipes 104 that emit the light, it is recognized that individual light rays travel in various directions and are not constrained within the specific zones 140. The zones 140 may extend generally through the lens 116 and into the region 138 of the environment. Thus, as the light pipes 104A-C receive light at different times, the zones 140A-C are illuminated at different times, and an observer views different axial locations of the region 138 illuminated at different times, creating a dynamic lighting effect.

The light sources 202 (shown in FIG. 2) may be sequenced such that zones 140 are illuminated in an order so the light appears to be traveling parallel to the longitudinal axis 110 towards and/or away from the second end 114 of the holder 102. The light sources 202 may be sequenced by controlling the light sources 202 to generate light at different relative times and/or for different lengths of time. For example, the light pipes 104A-C may be illuminated in quick succession or in a slower succession depending on the frequency that the corresponding light sources 202 generate light pulses. Varying the frequency of the light sources 202 modifies the dynamic light effect produced. In addition to or instead of varying the timing that the light pipes 104 are illuminated, the dynamic light effect may be modified by varying the optical characteristics (e.g., wavelength, luminance, and the like) of the light generated by the light sources 202. Therefore, even if multiple light pipes 104 receive light generated by corresponding light sources 202 at the same time, the optical characteristics of one or more of the lights may change over time to provide the dynamic light effect because the different zones 140 are illuminated with different colors or intensities of light. Furthermore, the light assembly 100 may be configured to provide static lighting when desired, instead of dynamic lighting. One or more of the light sources 202 may be controlled to generate light over a period of time without being sequenced in order to provide ambient lighting within an automobile, for example. Therefore, by controlling the characteristics and timing of light emitted by the light sources 202, the light assembly 100 may provide dynamic and/or static lighting effects of various color and brightness.

The light assembly 100 may be used in various applications, such as automotive interior lighting, automotive exterior lighting, commercial lighting, household devices, and the like. The length of the light assembly 100 may be varied by changing the length of the light pipes 104 and/or the holder 102. For a longer light assembly 100, the frequency or other optical characteristics of the light generated by the light sources 202 (shown in FIG. 2) may be modified to account for a longer path length through the light pipes 104. In an alternative embodiment, a second connector (in addition to the first connector 106) with additional light sources may be coupled to the distal ends 124 of the light pipes 104 in order to supply light into the light pipes 104 from the distal ends 124 towards the attachment ends 122 in order to increase the amount of light propagating through the light pipes 104.

FIG. 2 is an exploded perspective view of the connector 106 of the light assembly 100 of FIG. 1 according to an embodiment. The connector 106 includes the housing 130, the light sources 202 within the housing 130, and power and/or communication wires 204. The wires 204 provide power and/or control signals to the light sources 202 to control light generation. The housing 130 is formed as an assembly that includes a front shell 206 and a rear shell 208 (for example, a cover). As shown in FIG. 2, the front and rear shells 206, 208 are unassembled and separated, displaying the light sources 202 within.

The light sources 202 are operatively coupled to a light engine 210. The light engine 210 includes electronic control gear associated with the light sources 202, such as drivers, controllers, and/or associated circuitry. The light engine 210 controls one or more optical characteristics of the light generated by the light sources 202. For example, the light engine 210 may provide power to the light sources 202, as well as adjust the timing, wavelength, luminous flux, and/or polarization of the light generated by the light sources 202. The light engine 210 may include a printed circuit board (PCB) 212. For example, the PCB 212 may embed drivers and/or controllers that control the light generated by the light sources 202. The wires 204 may be fixed to the PCB 212 by soldering, using adhesive, or mechanically coupling to provide power and/or control signals to the light engine 210.

In an exemplary embodiment, the connector 106 includes three light sources 202—a first light source 214, a second light source 216, and a third light source 218—although greater or fewer than three light sources may be used in other embodiments. Each light source 202 is configured to individually generate light. The light sources 202 are electrically coupled to the PCB 212. Optionally, the light sources 202 are mounted on the PCB 212. In the illustrated embodiment, the light sources 202 are all mounted to the same PCB 212 of the light engine 210. In other embodiments, the light sources 202 may be mounted and/or electrically coupled to different PCBs and/or may be part of different light engines. In an alternative embodiment, the light sources 202 may be mounted directly to the housing 130 instead of the PCB 212.

The light sources 202 may be LEDs. One or more of the light sources 202 may be RGB LEDs that emit red light, green light, blue light, or combinations thereof. For example, each of the three light sources 214-218 may be RGB LEDs. The light engine 210 controls the light sources 214-218 individually to produce three lights that may have different optical characteristics, such as wavelength (e.g., color), luminance, and the like. For example, the light engine 210 may control the first light source 214 to generate a red light, the second light source 216 to generate a green light, and the third light source 218 to generate a blue light.

In another example, the light engine 210 may control each of the three light sources 214-218 to generate a different shade of a single color, such as red. Optionally, one or more of the light sources 202 may be a monochromatic LED, such as a white LED, that emits monochromatic white light. In alternative embodiments, light sources other than LEDs may be utilized. In an embodiment, the connector 106 may be utilized in standard automotive 12V systems.

The front shell 206 and rear shell 208 of the housing 130 may be formed of one or more dielectric materials to provide electrical insulation for the electronic components, such as the light sources 202, the PCB 212, and associated circuitry within the assembled housing 130. For example, the shells 206, 208 may be composed of one or more of plastic or another polymer, rubber, glass, or the like. The shells 206, 208 optionally may be formed by a molding process. The front shell 206 and the rear shell 208 are configured to at least partially surround the light sources 202 when the rear shell 208 is assembled to the front shell 206. The front shell 206 includes the ports 132 that receive the light pipes 104 (shown in FIG. 1). The ports 132 extend through the front shell 206 and are configured to provide optical paths from the light sources 202 to the corresponding light pipes 104. The light sources 202 may be positioned within the front shell 206 and aligned with the corresponding ports 132 to provide linear optical paths to the light pipes 104. Optionally, lenses 222 may be positioned within the ports 132 or adjacent to the ports 132 between the light sources 202 and the corresponding light pipes 104. The lenses 222 may be formed of a clear light transmissive material, such as glass, polycarbonate and/or acrylic. The lenses 222 are configured to focus and/or collimate light rays from the light sources 202 towards the attachment ends 122 (shown in FIG. 1) of the corresponding light pipes 104. Alternatively, the connector 106 may not include the lenses 222, and the light generated by the light sources 202 is emitted directly into the corresponding light pipes 104.

During assembly, the rear shell 208 couples to a rear side 224 of the front shell 206, to define the housing 130. The housing 130 at least partially surrounds the light engine 210, including the light sources 202, within a pocket 226 created between the front and rear shells 206, 208. The light engine 210 may be mounted within the housing 130 using latches, adhesive, interference fits, and/or by configuring the pocket 226 to have tight tolerances around the light engine 210 such that the light engine 210 is fixed in place. The wires 204, connected at one end to the light engine 210, protrude from an opening 230 of the housing 130. The wires 204 at the other end may be terminated to a plug 232 for electrical mating with a device (not shown), which may provide power and/or control signals to the light engine 210. The attachment end 122 (shown in FIG. 1) of each light pipe 104 (shown in FIG. 1) is loaded into a port 132 from a front side 228 of the front shell 206. The light pipes 104 may be retained within the ports 132 by an interference fit. Optionally, an adhesive and/or a mechanical latching feature may be used to retain the pipes 104 within the ports 132 to prohibit unintentional uncoupling of the light pipes 104 from the housing 130.

Figure 3:
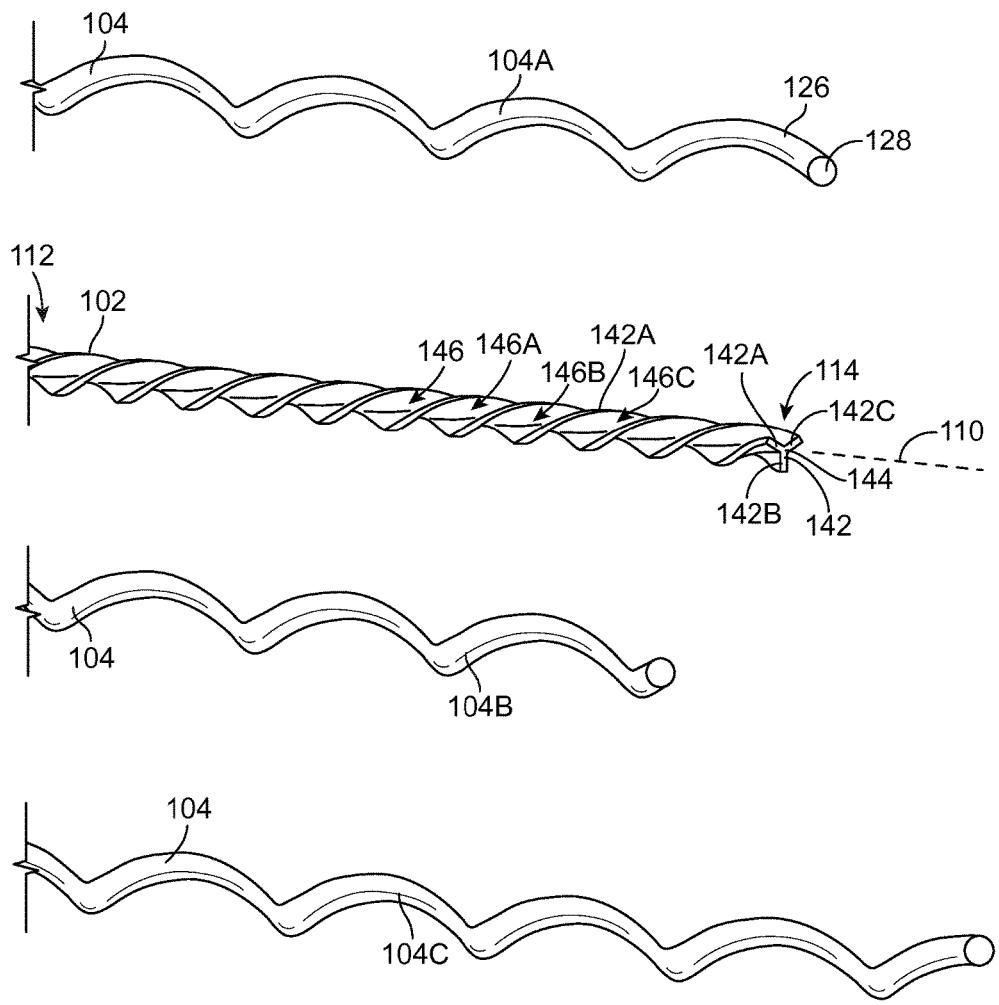
FIG. 3 is an exploded view of light pipes and a holder according to an embodiment of the light assembly of FIG. 1.

FIG. 3 an exploded perspective view of multiple light pipes 104 and the holder 102 according to an embodiment of the light assembly 100 of FIG. 1. The light pipes 104 are composed of a light transmissive material, such as glass or plastic. For example, the light pipes 104 may be formed of one or more polymers such as of poly(methyl methacrylate) (PMMA) resin, polycarbonate, a perfluorinated polymer, or the like. The light pipes 104 may be clear, or at least translucent, to allow the transmission of light through the interior region 128. In an embodiment, the light pipes 104 are formed of an acrylic material, such as PMMA. The acrylic light pipes 104 may be formed through an extrusion process, a molding process, or another manufacturing process. In another embodiment, the light pipes 104 may be fiber optic cables formed of a plurality of optically-conductive strands or fibers forming a core that is surrounded by a cladding layer. The optically-conductive strands are typically glass, but alternatively may be plastic or another polymer. The optically-conductive strands may transmit light independently along the length of the fiber optic cable. The cladding layer may reflect light from the strands that impinges thereon back towards the core due to the relative refractive indices of the cladding layer and the core.

The light pipes 104 may be generally cylindrical in shape, having a circular or elliptical cross-section. The light pipes 104 may be flexible to allow the pipes 104 to be spirally wound around the holder 102. Alternatively, the light pipes 104 may be semi-rigid with little flexibility, but the light pipes 104 may be molded or otherwise formed in a three-dimensional spiraling or helical shape that is compatible with the helical shape of the holder 102. The material and shape of the light pipes 104 permits light generated by the light sources 202 (shown in FIG. 2) to propagate through the light pipes 104 via internal reflection. Optionally, the light pipes 104 may include a reflective layer (not shown) within or on the outer surface 126 of the light pipes 104. For example, the reflective layer may be a paint, print, or other coating that is applied to the outer surface 126. The reflective layer reflects impinging light rays back towards the interior region 128 of the light pipe 104 to prohibit light from being emitted from the light pipe 104 in undesired directions and/or locations.

The holder 102 may be formed out of plastic, rubber, glass, metal, or the like. The holder 102 may be formed by a molding process, an extrusion process, or the like. The holder 102 may be rigid or semi-rigid to provide support for the light pipes 104. In other embodiments, the holder 102 may be flexible. The holder 102 in an embodiment is opaque (as opposed to light transmissive) such that light is absorbed by the holder 102 without transmitting through the holder 102. In an exemplary embodiment, the holder 102 includes multiple ridges or threads 142 that spiral around the longitudinal axis 110. Each ridge 142 extends from a radial center point 144. Each of the ridges 142 are joined together at the center point 144. The ridges 142 form spiral ramps along the length of the holder 102. The holder 102 may have a helicoid or fusilli shape. The holder 102 includes multiple channels 146 that are each defined between two of the ridges 142, such as two adjacent ridges 142. The channels 146 spiral around the longitudinal axis 110 along with the corresponding ridges 142, and may be referred to as helical channels. Each channel 146 is configured to receive a light pipe 104 therein.

In the illustrated embodiment, the holder 102 includes three ridges 142A, 142B, and 142C. The three ridges 142A-C define three channels 146A, 146B, 146C therebetween. The three channels 146A-C each receive one of the three light pipes 104A, 104B, 104C shown in FIG. 3. For example, light pipe 104A may be received in channel 146A, light pipe 104B may be received in channel 146B, and light pipe 104C may be received in channel 146C when the light pipes 104 are assembled to the holder 102. In other embodiments, the holder 102 may include other numbers of ridges 142 and channels 146 to accommodate other than three light pipes 104.

During assembly, each light pipe 104 is spirally wound along the holder 102 within one of the channels 146. The ridges 142 may be at least semi-rigid and fixed in position such that the light pipes 104 conform to the profile of the ridges 142. In an exemplary embodiment, the ridges 142A-142C each spiral around the center point 144 with a uniform profile, which may refer to a rotational profile, a radial profile, an axial profile, or the like. For example, in an embodiment the axial distance of each rotational revolution of the ridges 142 is equal. Since the ridges 142A-142C have uniform profiles, so too do the channels 146A-146C that are defined by the ridges 142A-142C. For example, the channels 146A-146C have a consistent width along the length of the holder 102. The uniform profile of the ridges 142A-142C also may indicate that the radial length of the ridges 142A-142C (or the diameter of each revolution of the ridges 142A-142C) is consistent along the length of the holder 102, such that the holder 102 has a helicoid shape. As such, the light pipes 104A-104C that are received in each of the channels 146A-146C have a common profile and spacing throughout the length of the holder 102. The common profile and spacing of the light pipes 104 provides a smooth and consistent dynamic light effect.

Each ridge 142 may define part of two channels 146. For example, ridge 142A shown in FIG. 3 is located between channels 146B and 146C, such that ridge 142A defines a distal wall of channel 146B (more proximate to the second end 114 of the holder 102) and a proximate wall of adjacent channel 146C (more proximate to the first end 112 of the holder 102). When the light pipes 104B, 104C are received in the channels 146B, 146C, respectively, the ridge 142A may extend at least partially between the adjacent light pipes 104B, 104C. The ridge 142A may prohibit the light pipes 104B, 104C from contacting each other. In an exemplary embodiment, the ridge 142A may also be configured to absorb light that impinges thereon to prohibit light emitted from one of the light pipes 104B, 104C from being received within the other of the light pipes 104B, 104C. Thus, the ridges 142 may provide mechanical and optical separation of the light pipes 104. Without optical separation, light in one light pipe 104 may impinge upon an adjacent light pipe, which may mar the division between adjacent illuminated zones 140 (shown in FIG. 1) used to create dynamic lighting effects.

Figure 4:
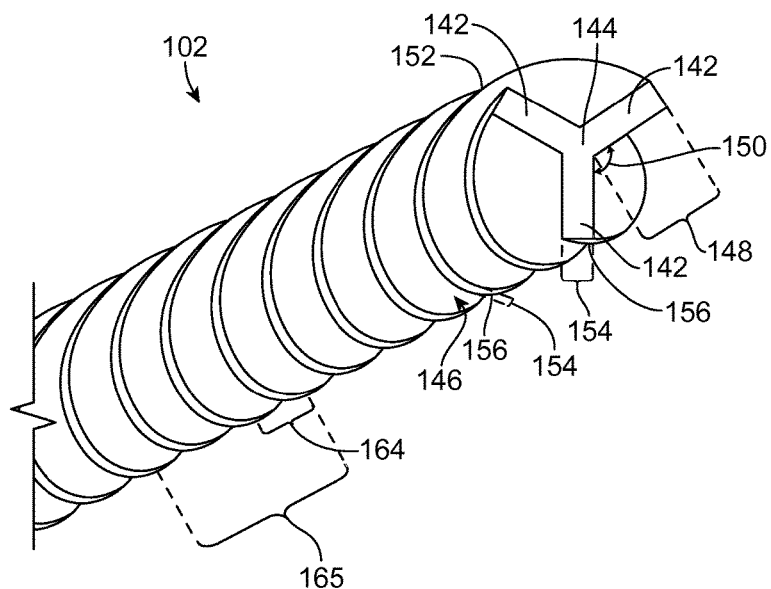
FIG. 4 is a perspective view of a portion of the holder shown in FIG. 3.

FIG. 4 shows a portion of an embodiment of the holder 102 of the light assembly 100 shown in FIG. 1. The holder 102 may be similar to the holder 102 shown in FIG. 3. The holder 102 includes three ridges 142 that each extend an equidistant length 148 from the center point 144. The ridges 142 may be equally spaced along the perimeter of the holder 102 such that the angle 150 between each of the ridges 142 is uniform. As shown in FIG. 4, the ridges 142 may each have a rectangular cross-section 152. Therefore, the thickness 154 of the ridges 142 may be uniform along the entire length 148 from the center point 144 to the outer edge 156. The rectangular cross-sections 152 provide the walls that define the channels 146 and also optically separate the adjacent light pipes 104 (shown in FIG. 3).

Figure 5:
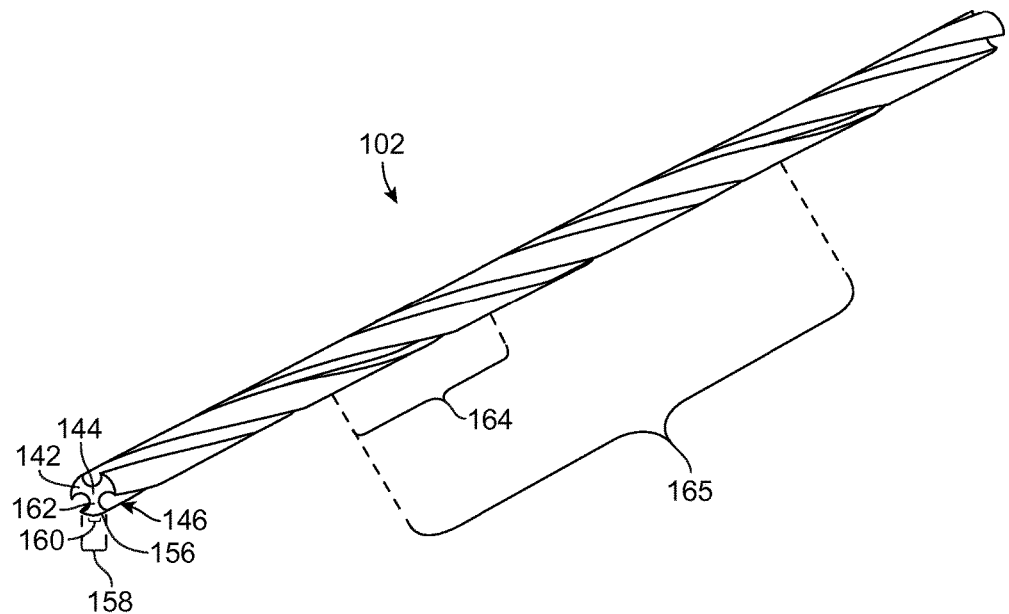
FIG. 5 is a perspective view of an alternative embodiment of the holder shown in FIG. 3.

FIG. 5 shows another embodiment of the holder 102 of the light assembly 100 shown in FIG. 1. Similar to the holder 102 shown in FIG. 4, the holder 102 shown in FIG. 5 may include three ridges 142 that are equally spaced (and angled) along the perimeter of the holder 102 and have equal radial lengths from the center point 144. Unlike the holder 102 shown in FIG. 4, the ridges 142 of the holder 102 in FIG. 5 may not have a rectangular cross-section with a uniform thickness along the length. For example, the thickness of the ridges 142 may increase with radial distance from the center point 144, such that the outer edge 156 of the ridges 142 have a first thickness 158 than is greater than a second thickness 160 of an inner region 162 more proximate to the center point 144. Due to the increasing thickness of the ridges 142 with radial distance from the center point 144, the ridges 142 may surround more of the perimeter of the light pipes 104 (shown in FIG. 3) than the embodiment of the holder 102 shown in FIG. 4. For example, the ends of the thicker outer edge 156 cover a greater percentage of the perimeter of the light pipes 104 within the channels 146. The channels 146 optionally may have a smaller diameter (defined between the two adjacent ridges 142) at the outer edge 156 than along the inner region 162. The smaller diameter at the outer edge 156 may provide some resistance upon loading the light pipe 104 into the channel 146. For example, the ridges 142 may deflect slightly to allow the light pipe 104 to enter the channel 146, and the thick outer edges 156 may provide a retention force that holds the light pipe 104 within the channel 146. In addition, the thicker outer edges 156 of the ridges 142 may provide enhanced optical separation between adjacent light pipes 104 in adjacent channels 146, since the ridges 142 wrap around a greater percentage of the perimeter of the light pipes 104. Therefore, light emitted from a light pipe 104 towards an adjacent light pipe 104 may have a greater probability of being blocked by the intervening ridge 142 that separates the two light pipes 104, as opposed to the holder 102 shown in FIG. 4.

The holder 102 of FIG. 5 may have a greater pitch 164 than the holder 102 shown in FIG. 4. As used herein, "pitch" refers to the axial distance between the midpoint of each adjacent ridge 142. The axial distance for a single ridge 142 to make one full rotation around the holder 102 is referred to herein as a "unit length" 165. The holder 102 of FIG. 5 has both a greater pitch 164 and a greater unit length 165 than the pitch 164 and unit length 165, respectively, shown in FIG. 4 because the ridges 142 shown in FIG. 5 cover a greater axial distance per revolution than the ridges 142 shown in FIG. 4. The pitch 164 and unit length 165 may affect the number and size of the illuminated zones 140 (shown in FIG. 1), which affects the dynamic lighting effects produced.

The pitch 164 and the unit length 165 of the holder 102 may be selected based on the application and/or the materials of the light pipes 104. For example, if the unit length 165 of the holder (for example, the axial distance per revolution of each ridge 142) is too short, the curve of the channels 146 may exceed the allowable bend radius of the light pipes 104, causing the light pipes 104 to snap, crack, or otherwise break. Furthermore, even if the light pipes 104 withstand the curve of the channels 146, the curve of the light pipes 104 may cause the light within the light pipes 104 to refract from the light pipe 104 prematurely, depending also on the refractive indices of the light pipe 104 and the surrounding material (for example, air).

Figure 6:
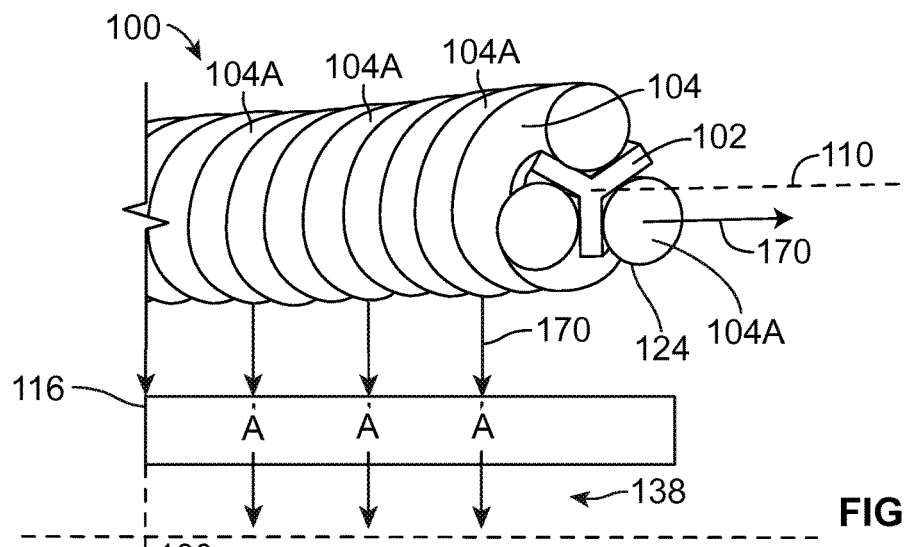
FIG. 6 is a perspective view of a portion of a light assembly according to an embodiment at a first time.
Figure 7:
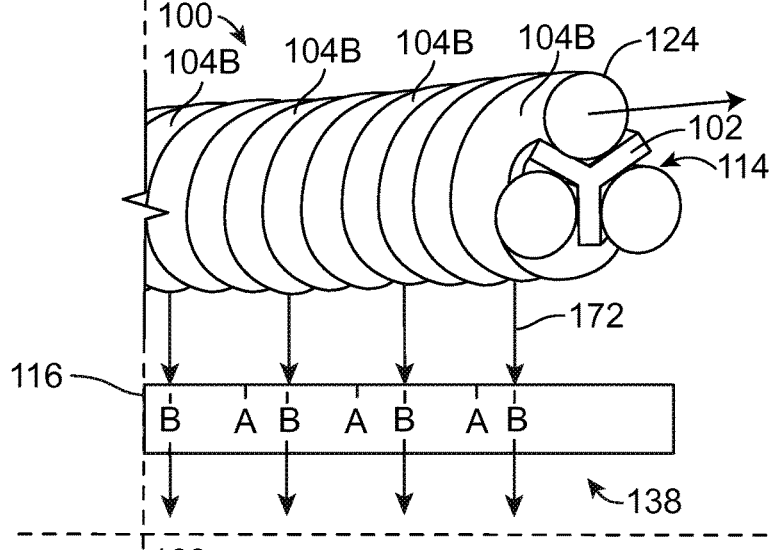
FIG. 7 is a perspective view of a portion of a light assembly according to an embodiment at a second time.
Figure 8:
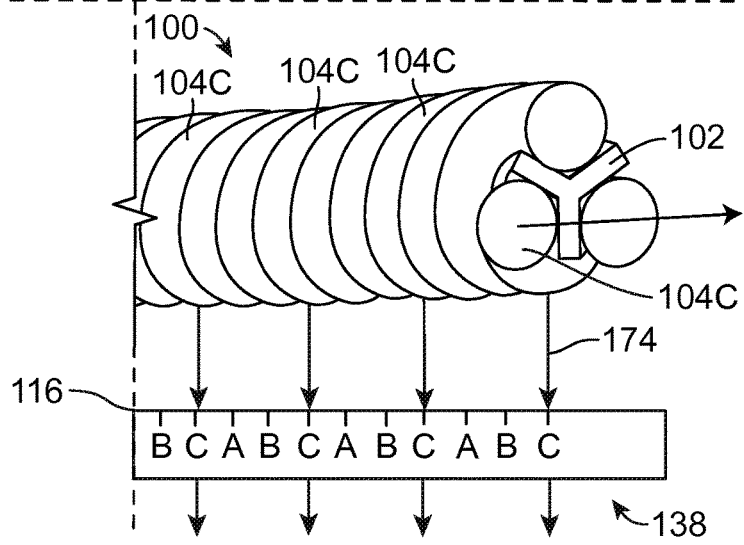
FIG. 8 is a perspective view of a portion of a light assembly according to an embodiment at a third time.

FIGS. 6-8 show a distal end of the light assembly 100 at various times according to an embodiment. FIGS. 6-8 show the light pipes 104, the holder 102, and the lens 116. Other components, such as the optional shroud 108 (shown in FIG. 1) and the connector 106 (shown in FIG. 1) are not displayed for illustrative purposes. FIG. 6 may represent the light assembly 100 at a first time. The first time may be an instant in time or a period in time. At the first time, the light assembly 100 controls one light source 202 (shown in FIG. 2) to generate a first light 170. The first light 170 is received by a first light pipe 104A and propagates along the length of the light pipe 104A via internal reflection. As shown in FIG.

6, some of the light 170 is emitted from the light pipe 104A prior to reaching the distal end 124 of the light pipe 104A in a direction transverse to the longitudinal axis 110. At least some of the emitted light 170 is directed towards the lens 116. The light 170 may impinge upon the lens 116 at location A. Since the light pipe 104A is wrapped around the holder 102 in multiple revolutions, the light 170 may strike the lens 116 at multiple locations labeled A. At least some of the light 170 that impinges upon the lens 116 may be transmitted through the lens 116 and emitted into the region 138 of the environment where the light 170 is visible to observers. At least some of the light 170 may not be emitted from the light pipe 104A until the light 170 is discharged from the distal end 124 of the light pipe 104A. Such light may be absorbed or reflected back towards the light pipe 104A to increase the amount of light that is emitted towards the lens 116.

FIG. 7 shows the light assembly 100 at a second time that is after the first time. At the second time, another light source 202 (shown in FIG. 2) is controlled to generate a second light 172 that is received by a second light pipe 104B. The second light 172 propagates within the light pipe 104B towards the distal end 124. At least some of the light 172 is emitted from the light pipe 104B towards the lens 116 and impinges upon the lens 116 at multiple second locations B. The first light 170 (shown in FIG. 6) is no longer transmitted through the first light pipe 104A (FIG. 6) at the second time. The second location B may be displaced axially from the location A that the first light 170 impinged upon the lens 116 due to the displaced axial locations of the light pipes 104A, 104B relative to each other. For example, light pipe 104B is adjacent to the light pipe 104A on the side more proximate to the second end 114 of the holder 102, so the location B that the light 172 strikes the lens 116 is also more proximate to the second end 114 than location A where the light 170 strikes the lens 116. The locations A, B may correspond to the illuminated zones 140A and 140B shown in FIG. 1, respectively. The light 172 may be transmitted through the lens 116 and emitted into the region 138 of the environment.

FIG. 8 shows the light assembly 100 at a third time that is after the first and second times. At the third time, a third light 174 is generated by a light source 202 (shown in FIG. 2), and the third light 174 is received by a third light pipe 104C for propagation within the light pipe 104C. At least some of the light 174 is emitted from the light pipe 104C towards the lens 116 and impinges upon the lens 116 at a third location C (which may be multiple locations due to the revolutions of the light pipe 104C around the holder 102). Also at the third time, the first light 170 (shown in FIG. 6) and the second light 172 (shown in FIG. 7) are no longer emitted towards the lens 116. The markers for the locations A and B where the lights 170 and 172, respectively, impinged upon the lens 116 are shown in FIG. 8. The location C is closer to the second end 114 of the holder 102 relative to the other two locations A and B. The light 174 may be transmitted through the lens 116 and emitted into the region 138 of the environment where the light 174 is visible to observers.

Therefore, as shown in FIGS. 6-8, the light that is visible to observers may move from the location A to location B and then to location C from the first time to the third time. The light assembly 100 thus may produce a dynamic lighting effect by sequencing the light sources 202 (shown in FIG. 2) optically coupled to the light pipes 104. The dynamic lighting effect may appear to observers as if a single light source is physically moving (for example, being moved) along the longitudinal axis 110 of the holder 102, such as towards or away from the second end 114 of the holder 102.

In addition or alternatively to the lights 170, 172, and 174 being sequenced at different times, the lights 170, 172, and 174 may be controlled to have different colors, luminosity, or other optical characteristics to produce and/or modify a dynamic lighting effect. The light assembly 100 may be controlled to produce numerous different lighting effects (including both static and dynamic lighting), while using only one light source 202 to illuminate each light pipe 104.

At least one technical effect of the light assembly 100 described herein is the ability to provide a dynamic light effect for various applications using elongated light pipes. The light assembly 100 also provides the technical effect of producing dynamic lighting effects using only a few light sources that are not spaced apart along the length of the light assembly 100. Another technical effect of the light assembly 100 is the ability to provide a smooth dynamic lighting effect using twisted light pipes around a single holder. The holder may be configured to guide the coiling of the light pipes such that each light pipe has a similar spiraling or helical profile as the other light pipes. The holder may also be configured to optically separate adjacent light pipes by blocking light emitted from one light pipe from being received within another light pipe, which could blend light from different light pipes and negatively affect the dynamic lighting effect.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A light assembly comprising:
   a holder extending along a longitudinal axis between a first end and a second end, the holder including multiple ridges that spiral around the longitudinal axis, the holder including multiple channels, each channel defined between two of the ridges;
   multiple light pipes that each include a light transmissive interior region, each of the light pipes disposed in one of the channels of the holder, the light pipes each having an attachment end that is configured to receive light from a light source, each light pipe further configured to transmit the light through the interior region for at least a length of the light pipe before the light is emitted from the light pipe; and a lens extending parallel to the longitudinal axis of the holder and configured to receive at least some of the light emitted from the light pipe, the lens formed of a light transmissive material such that the light from the light pipes that impinges upon the lens is transmitted through the lens and illuminates a surrounding environment.

2. The light assembly of claim 1, wherein the light assembly includes at least three light pipes that wrap around the holder in a repeating sequence, the light pipes each configured to emit light from the respective interior region to illuminate a corresponding axial zone perceivable by an observer, the axial zones aligned parallel to the longitudinal axis in the repeating sequence.

3. The light assembly of claim 2, wherein the repeating sequence includes a repeating pattern of a first light pipe, a second light pipe, and a third light pipe such that the second light pipe is between the first and third light pipes, the light emitted from the second light pipe illuminating a second axial zone that is between a first axial zone that is illuminated by light emitted from the first light pipe and a third axial zone that is illuminated by light emitted from the third light pipe.

4. The light assembly of claim 1, wherein the lens receives light from each of the light pipes at different locations along a length of the lens.

5. The light assembly of claim 1, further comprising one or more light sources optically coupled to the attachment ends of the light pipes, the one or more light sources configured to generate light at different times such that the corresponding light pipes receive light at different times and emit the light at different axial locations along the longitudinal axis of the holder to create a dynamic lighting effect that provides an appearance of a single light source physically moving parallel to the longitudinal axis of the holder.

6. The light assembly of claim 1, wherein the ridges spiral around the longitudinal axis of the holder with a uniform profile, the multiple light pipes received in the channels being equally spaced apart from each other along the length of the holder between the first and second ends.

7. The light assembly of claim 1, wherein each of the ridges extends between adjacent light pipes and prohibits light emitted from one of the light pipes from being received by an adjacent light pipe.

8. The light assembly of claim 1, wherein the light pipes are fiber optic cables, the light transmissive interior region of each of the light pipes including multiple glass strands commonly held within a cladding layer.

9. The light assembly of claim 1, wherein the light pipes are composed of a solid acrylic material.

10. A light assembly comprising:
a holder extending along a longitudinal axis between a first end and a second end, the holder including multiple ridges that spiral around the longitudinal axis, the holder including multiple channels, each channel defined between two of the ridges;
multiple light pipes that each include a light transmissive interior region, each of the light pipes disposed in one of the channels of the holder, the light pipes each having an attachment end that is configured to receive light from a light source, each light pipe further configured to transmit the light through the interior region for at least a length of the light pipe before the light is emitted from the light pipe; and
a shroud surrounding a first portion of a perimeter of the light pipes and the holder along a length of the holder, the shroud configured to at least one of absorb or reflect light emitted from the light pipes along the first portion of the perimeter that impinges on the shroud, wherein light emitted from the light pipes along a remaining portion of the perimeter not surrounded by the shroud is not absorbed or reflected by the shroud and illuminates a surrounding environment outside of the shroud.

11. The light assembly of claim 1, wherein the ridges extend radially from a center point of the holder, the thickness of the ridges increasing with increasing radial distance from the center point such that the thickness at an outer edge of each ridge is greater than at an inner region of the respective ridge more proximate to the center point, the channels defined between the ridges having a smaller diameter between the outer edges of the ridges than between the inner regions of the ridges.

12. A light assembly comprising:
a connector that includes a housing and multiple light sources held within the housing;
multiple light pipes that are each elongated between an attachment end and a distal end, the attachment end of each light pipe being coupled to the housing and optically coupled to one of the light sources, the light emitted by the light sources being received by the corresponding light pipe at the attachment end and transmitted through the light pipe via internal reflection towards the distal end; and
a holder that is elongated along a longitudinal axis between a first end and a second end, the holder having multiple ridges extend radially outward from a center point of the holder, the ridges spiraling around the longitudinal axis along the length of the holder between the first and second ends, the holder including multiple channels that are each defined between two of the ridges, each channel configured to hold one of the light pipes therein.

13. The light assembly of claim 12, wherein the light assembly includes three light pipes that wrap around the holder in a repeating sequence, the repeating sequence including a repeating pattern of a first light pipe, a second light pipe, and a third light pipe such that the second light pipe is between the first and third light pipes, light emitted from the three light pipes illuminating corresponding axial zones perceivable by an observer, the axial zones aligned parallel to the longitudinal axis in the repeating sequence such that the light emitted from the second light pipe illuminates a second axial zone that is between a first axial zone illuminated by light emitted from the first light pipe and a third axial zone illuminated by light emitted from the third light pipe.

14. The light assembly of claim 13, wherein the light sources are configured to generate light at least one of at different times or of different colors or intensities such that the axial zones are illuminated at least one of at different times or by different colors or intensities of light, creating a dynamic lighting effect.

15. The light assembly of claim 12, further comprising a lens extending parallel to the longitudinal axis of the holder, the lens formed of a light transmissive material such that light emitted from the light pipes that impinges upon the lens is transmitted through the lens and illuminates a region of a surrounding environment.

16. The light assembly of claim 12, wherein the ridges spiral around the longitudinal axis of the holder with a uniform profile, the multiple light pipes held in the channels being equally spaced apart from each other along the length of the holder between the first and second ends.

17. The light assembly of claim 12, wherein each of the ridges extends between adjacent light pipes and prohibits light emitted from one of the light pipes from being received by an adjacent light pipe.

18. The light assembly of claim 12, wherein the connector includes at least one light engine that controls the timing and optical characteristics of the light generated by each of the light sources.

19. The light assembly of claim 12, further comprising a shroud surrounding a first portion of a perimeter of the light pipes and the holder along a length of the holder, the shroud configured to at least one of absorb or reflect light emitted from the light pipes along the first portion of the perimeter that impinges on the shroud, wherein light emitted from the light pipes along a remaining portion of the perimeter not surrounded by the shroud is not absorbed or reflected by the shroud and illuminates a surrounding environment outside of the shroud.

20. The light assembly of claim 12, wherein the ridges extend radially from a center point of the holder, the thickness of the ridges increasing with increasing radial distance from the center point such that the thickness at an outer edge of each ridge is greater than at an inner region of the respective ridge more proximate to the center point, the channels defined between the ridges having a smaller diameter between the outer edges of the ridges than between the inner regions of the ridges.

\* \* \* \* \*